(12) United States Patent
De Greef

(10) Patent No.: US 9,045,290 B2
(45) Date of Patent: Jun. 2, 2015

(54) HOLDER, DEVICE AND METHOD FOR SORTING AND/OR TRANSPORTING PRODUCTS

(75) Inventor: Jacob Hendrik De Greef, Waardenburg (NL)

(73) Assignee: De Greef's Wagen—, Carrosserie-En Machinebouw B.V., Tricht (NL)

( * ) Notice: Subject to any disclaimer, the term of this patent is extended or adjusted under 35 U.S.C. 154(b) by 301 days.

(21) Appl. No.: 13/382,859

(22) PCT Filed: Jul. 2, 2010

(86) PCT No.: PCT/NL2010/050422
§ 371 (c)(1),
(2), (4) Date: Jun. 6, 2012

(87) PCT Pub. No.: WO2011/005083
PCT Pub. Date: Jan. 13, 2011

(65) Prior Publication Data
US 2012/0234653 A1 Sep. 20, 2012

(30) Foreign Application Priority Data
Jul. 9, 2009 (NL) .................................... 2003166

(51) Int. Cl.
*B65G 47/46* (2006.01)
*B65G 47/38* (2006.01)
*B07C 5/36* (2006.01)
*B65G 17/42* (2006.01)

(52) U.S. Cl.
CPC . *B65G 47/38* (2013.01); *B07C 5/36* (2013.01); *B65G 17/42* (2013.01); *B65G 2201/0211* (2013.01)

(58) Field of Classification Search
USPC ....................................... 198/370.04, 370.01
See application file for complete search history.

(56) References Cited

U.S. PATENT DOCUMENTS 7,284,654 B2 * 10/2007 Affaticati et al. ........ 198/370.04
8,528,721 B2 * 9/2013 Eiserloh et al. ............... 198/360

FOREIGN PATENT DOCUMENTS

EP       0231979 A2   8/1987
NL       1016453 C2   5/2002

* cited by examiner

*Primary Examiner* — Gene Crawford
*Assistant Examiner* — Lester Rushin
(74) *Attorney, Agent, or Firm* — The Webb Law Firm

(57) ABSTRACT

The present invention relates to a holder, device or method for sorting and/or transporting products, the holder comprises: a product carrier (4) movable in a transport direction for receiving and transporting the product to be transported; a first shaft (6) operatively connected to the product carrier (4) for rotating the product carrier in order to discharge the product transported with the product carrier; tilting means (14) for tilting the product carrier (4) about the first shaft (6) at a discharge position; and a second shaft (8) which is operatively connected to the product carrier (4) and to which a flexible member (10) can be releasably attached for discharging the product from the product carrier (4) in controlled manner.

14 Claims, 4 Drawing Sheets

HOLDER, DEVICE AND METHOD FOR SORTING AND/OR TRANSPORTING PRODUCTS

BACKGROUND OF THE INVENTION

1. Field of the Invention

The present invention relates to a holder for sorting and/or transporting products. Such a holder is particularly aimed at transporting preferably fresh products, such as potato, vegetable and fruit products, including apples, pears and peppers.

2. Description of Related Art

Holders are known in practice which are applied for devices for the purpose of sorting and/or transporting products. The products are here positioned in the holder by for instance a transfer apparatus, after which the products are transported in the holder. At a discharge position the holder is tilted so that the product rolls out of the holder to for instance a water channel or conveyor belt. The holder tilts here about a rotation shaft. In order to support the falling movement or rolling movement of the product out of the holder during discharge, a flap is provided in such a holder with which the product for discharge is guided to the water channel or conveyor belt. In the known holders this flap is usually attached to the rotation shaft of the holder or to the rear outer end of the holder.

In known holders there occurs soiling, as well as wear, particularly on the flap which is attached to the holder. This means that such a flap must be cleaned and/or replaced regularly. For this purpose the holder must be disassembled from the transport device. In practice such transport devices make use of a large number of holders, up to several thousand per device. In such a case a cleaning operation involves a labour-intensive disassembly of all these holders, which additionally results in prolonged standstill of the device.

The present invention has for its object to provide a more user-friendly holder.

SUMMARY OF THE INVENTION

This object is achieved with the holder for sorting and/or transporting products according to the present invention, the holder comprising:
- a product carrier movable in a transport direction for receiving and transporting the product to be transported;
- a first shaft operatively connected to the product carrier for rotating the product carrier in order to discharge the product transported with the product carrier;
- tilting means for tilting the product carrier about the first shaft at a discharge position; and
- a second shaft which is operatively connected to the product carrier and to which a flexible member can be releasably attached for discharging the product from the product carrier in controlled manner.

By providing the holder or cup with a first shaft and in addition with a second shaft, or sub-shaft, to which a flexible member is attached, for instance in the form of a flap, the attachment of the flexible member is in a practical sense disengaged from the first rotation shaft. It is hereby possible to detach the flexible member from the holder without this latter having to be disassembled from a transport device. This is made possible by for instance providing the second shaft substantially parallel to the first rotation shaft, wherein the flexible member is freely slidable onto and off this second shaft without the first rotation shaft having to be disassembled. This greatly simplifies cleaning and/or replacing of the flexible members. The second shaft can here be provided free at one outer end, i.e. be provided with a free outer end, so that the flexible member can be pushed onto the shaft from this outer end. It is also possible to provide the second shaft with an interruption, for instance halfway along the shaft, so that the flexible member can be pushed to two sides from this interruption onto both parts of the second shaft. Replacement of the flexible member is possible with the reverse movement.

An additional advantage of a second shaft is that the influence of the flexible member on a possible weight measurement of the holder with product is hereby reduced or even wholly obviated. The accuracy and reliability of such a measurement are hereby increased.

In an advantageous preferred embodiment according to the present invention the holder comprises an arm which is connected on one side to a mounting shaft and connected on another side to the first and/or second shaft.

The mounting shaft preferably extends here through or close to the centre of gravity of a holder filled with product. A stable construction is hereby realized. In a possible embodiment the at least one arm is connected rigidly to the second shaft. A relatively stiff construction is hereby obtained. In an alternative embodiment the at least one arm is rotatably connected to the second shaft in order to obtain a flexible construction. The choice for one of these embodiments depends on, among other factors, the overall configuration of a device in which the holders are applied, the products for transporting and the prevailing transport conditions.

It is additionally the case that a more accurate weighing of the product in the holder is possible through the use of the arms. This is brought about by providing the holder in independently movable manner relative to the first shaft when the arms are mounted on the second shaft of this holder. Such a weighing is for instance made possible by providing the holder with three contact points which come into contact with a weighing plate with which the weight of the holder with the product is measured. A better contact of the contact points with the weighing plate is ensured by the movement of the holder being made possible relative to the first shaft. The weight of the transported product is hereby obtained after making a correction for the weight of the holder. This weight can for instance be used in the sorting of the products.

The movable arm is preferably provided in rotatable manner. For instance torsion of the holder can hereby be obviated to some extent for the purpose of inter alia the measurement of the product in the holder. The holder is preferably provided here with at least two arms which are preferably rotatable independently of each other. Owing to this independent rotatability of preferably two arms it is possible to obviate a misalignment of the weighing plate relative to the holder. The flexible suspension achieves that the three contact points always rest on the weighing surface in stable manner. This results in a greater accuracy of the measurement, which is not affected by possible misalignment of shaft or weighing surface.

A better sorting of products can be realized due to the improved measurement accuracy. This contributes toward the overall final quality of the sorted batch of products transported using the holder according to the present invention.

In an advantageous preferred embodiment according to the present invention the holder comprises a ball hinge provided between the arm and first and/or second shaft.

An independent rotation of the preferably two arms becomes possible by providing a ball hinge or ball joint, whereby a flexible suspension is obtained. This achieves that misalignment and/or torsion of the holder can be prevented so as to improve the accuracy of a measurement.

In an advantageous preferred embodiment according to the present invention the product carrier is provided symmetrically such that the holder can be mounted on either side of transport means of a device for one or more holders.

The mounting of the flexible member, preferably in the form of a flap, on a second shaft makes it possible to provide the product carrier, into which the product to be transported is laid, with a wholly symmetrical form. This achieves that, in a device wherein a holder is provided on either side of the transport means, for instance in the form of a conveyor chain, only one type of holder is required. There is no left-hand or right-hand variant of the holder here. Not only does this limit storage costs for holding stocks of holders, it also avoids errors during assembly.

In an advantageous preferred embodiment according to the present invention the first shaft can be connected using a coupling piece to a transport means of a device for one or more holders.

By connecting the first shaft to the whole device using a coupling piece an overall device is obtained with which products can be transported in a desired manner. Through the use of a coupling piece a holder according to the invention can be mounted on, and if desired removed from, the whole device in simple manner. It is possible here to connect a holder, provided only with a first shaft, to the transport means in said manner, optionally without flap and without second shaft.

The coupling piece is preferably embodied such that a form-fitting can be realized with the transport means to which the first shaft can be connected. Providing a form-fitting for instance prevents the possibility of the first shaft moving out of the transport means in upward direction. The transport means is for instance a conveyor chain, wherein the connection is preferably a snap connection between the coupling piece, the first shaft and a chain link.

In a further preferred embodiment according to the present invention the flexible member comprises at least one opening.

Providing the flexible member, preferably in the form of a flap, with an opening enables a measurement to be performed in a substantially vertical direction. An opening must here also be provided in the holder. In the case that during use the flexible member lies in a substantially horizontal position partially under a following holder, an additional opening is preferably provided so that a measurement can also be performed for this holder.

In a further advantageous preferred embodiment according to the present invention the holder comprises a fixation member for fixing the product carrier in axial direction of the first shaft.

By providing a locking in axial direction using the fixation member, preferably in the form of a clip, the product carrier and the flexible member are positioned in rapid and unambiguous manner in axial direction of the first shaft. A further axial movement of the product carrier is not possible due to this locking. A good operation of the whole transport device is hereby achieved. Owing to a consistent positioning of the holders in axial direction a consistent measurement of the products can also be obtained, for instance in the case of a weight measurement, because the holder is always measured at the same position.

The invention also relates to a device for sorting and/or transporting products, wherein the device is provided with a holder as described above.

The same effects and advantages apply for such a device as described above for the holder.

The invention further also relates to a method for sorting and/or transporting products, comprising the steps of:

placing a product in a holder as described above;

transporting the product in the holder; and discharging the product from the holder.

The same effects and advantages as described above for the holder likewise apply to such a method. As additional step, the weighing of a holder can also be performed in accurate and reliable manner.

BRIEF DESCRIPTION OF THE DRAWINGS

Further advantages, features and details are elucidated on the basis of preferred embodiments thereof, wherein reference is made to be accompanying drawings, in which.

DESCRIPTION OF THE PREFERRED EMBODIMENTS

Figure 1:
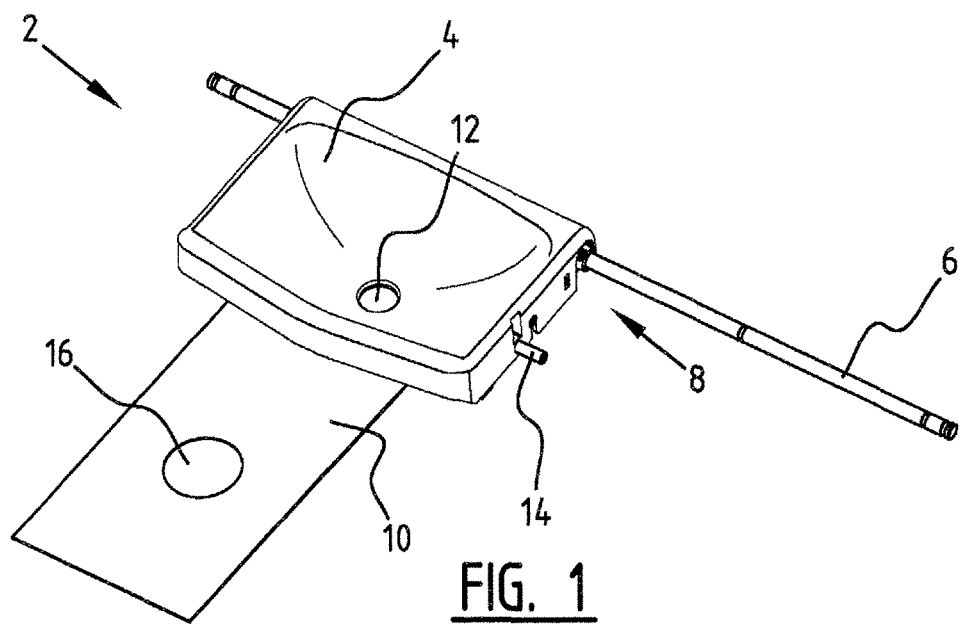
FIG. 1 shows a top view of the holder according to the invention.

A holder 2 (FIG. 1) is provided with a carrier or cup 4 which can rotate around a first shaft 6. Provided close to shaft 6 is a sub-shaft 8 to which a flap 10 can be attached. In the shown embodiment carrier 4 is provided with an opening 12 for the purpose, among others, of performing a measurement on the product. For discharging purposes holder 2 is provided with a tilting pin 14 which rests on a counter-part on the transport device on which holder 2 is mounted. At the desired discharge position tilting pin 14 is released and holder 2 tilts around shaft 6. Flap 10 is provided with an opening 16 which in the shown embodiment is provided in the centre of flap 10. Although one tilting pin 14 is provided in the shown embodiment, it will be apparent to the skilled person that two tilting pins 14 can for instance also be provided, one on each side of holder 2.

Figure 2:
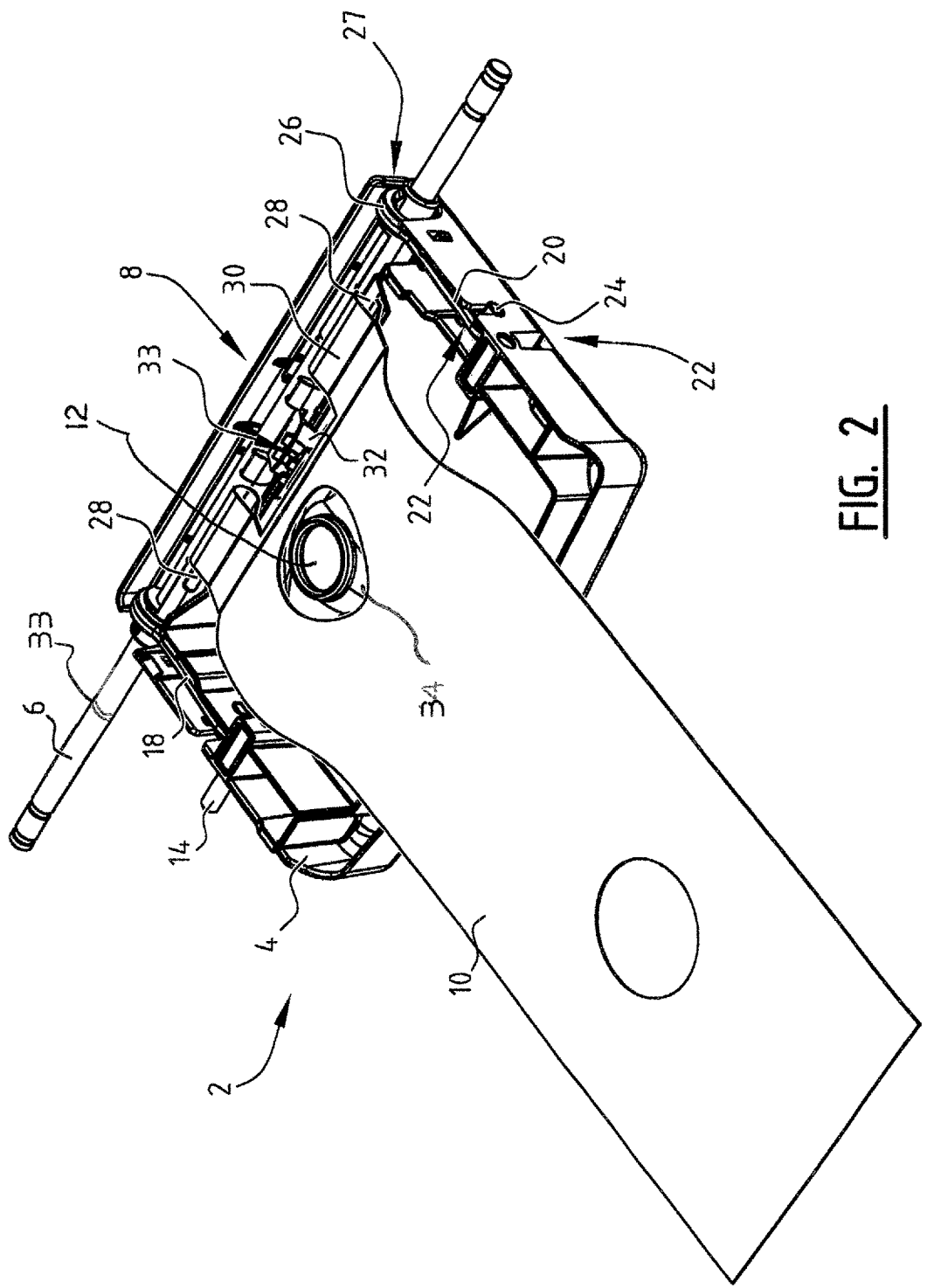
FIG. 2 shows a bottom view of the holder of FIG. 1.

A first arm 18 and a second arm 20 are provided on the underside of holder 2 (FIG. 2). A first outer end 22 of arm 20 is fixed to a mounting shaft 24. In the shown embodiment shaft 24 is formed by a protrusion on arm 20. The second outer end 26 of arm 20 is mounted rotatably around second shaft 8 using a type of ring. Shaft 8 is provided for this purpose with a fixed bush 27. In the shown embodiment bush 27 is placed over first shaft 6. Second outer end 26 is rotatable around bush 27. In the shown embodiment ring 26 forms, together with bush 27 of shaft 8, a type of ball joint with which a small relative rotation of arm 20 and second shaft 8 is made possible. Arm 18 is mounted in similar manner to arm 20. Second shaft 8 is provided with two protruding pins 28 to which flap 10 is attached using two loops 30. Pins 28 are formed integrally with the two bushes 27. This whole is provided with a clip 32. Clip 32 is snapped fixedly onto shaft 6 at the position of a notch 33 in order to realize fixation thereof in axial direction. In the shown embodiment second shaft 8 comprises bushes 27, pins 28 and clip 32 and is provided as a plastic whole which in use is mounted round the first metal shaft 6. This contributes toward a rapid and unambiguous assembly.

In addition to a first opening 16, flap 10 is provided with a second opening 34 in flap 10 at the position of opening 12 in carrier 4. For the shown embodiment the second opening 34 is intended for carrier 4, while opening 16 is intended for the adjacent holder 38. In the shown embodiment a bush 27 is provided per arm 18, 20. This enables a small relative rotation of arms 18, 20, for instance for correcting misalignment of carrier 4.

Figure 3A:
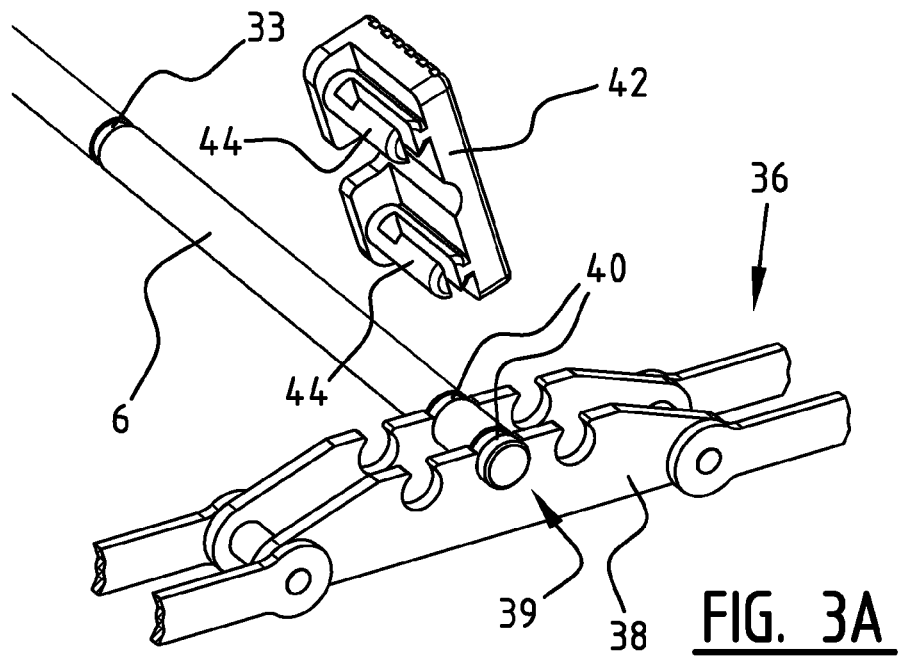
FIGS. 3A, B and C show views of mounting of the first shaft of the holder on a device provided with such holders.
Figure 3B:
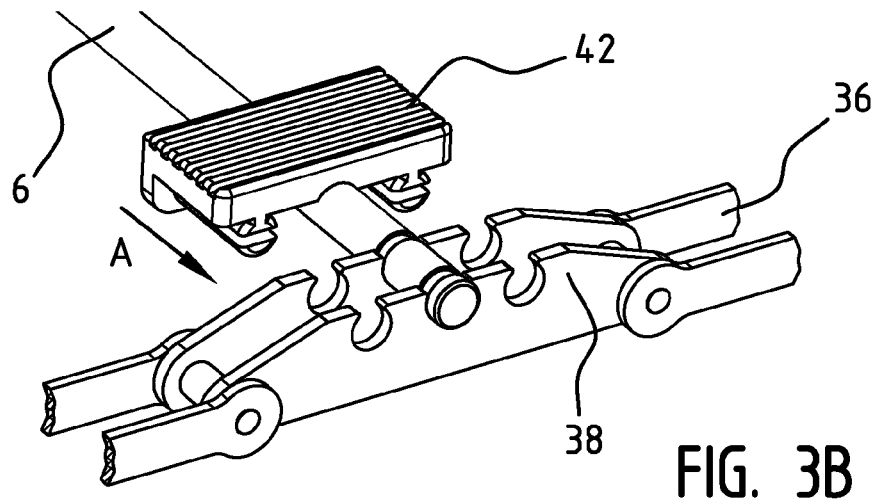
Figure 3C:
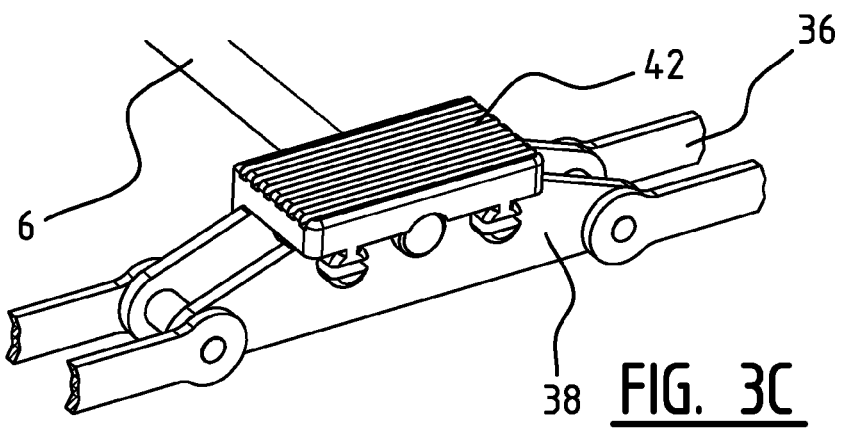

In the shown embodiment the connection or coupling of a holder 2 to the device in which holder 2 is used (FIGS. 3A, B and C) makes use of a conveyor chain 36 in which a coupling part 38 is provided. Coupling part 38 is provided with a number of recesses 39, in the shown embodiment three, into which the first shaft 6 can be placed at the position of a notch 40 therein. A clip or coupling piece 42 can also be placed over shaft 6 and be pushed in the direction of arrow A until catches 44 are placed in the two recesses 39 in coupling part 38 remaining in the shown embodiment. Using clip or coupling piece 42 shaft 6 is connected to chain 36 in form-closing manner so that shaft 6 cannot detach therefrom in undesired manner.

Figure 4:
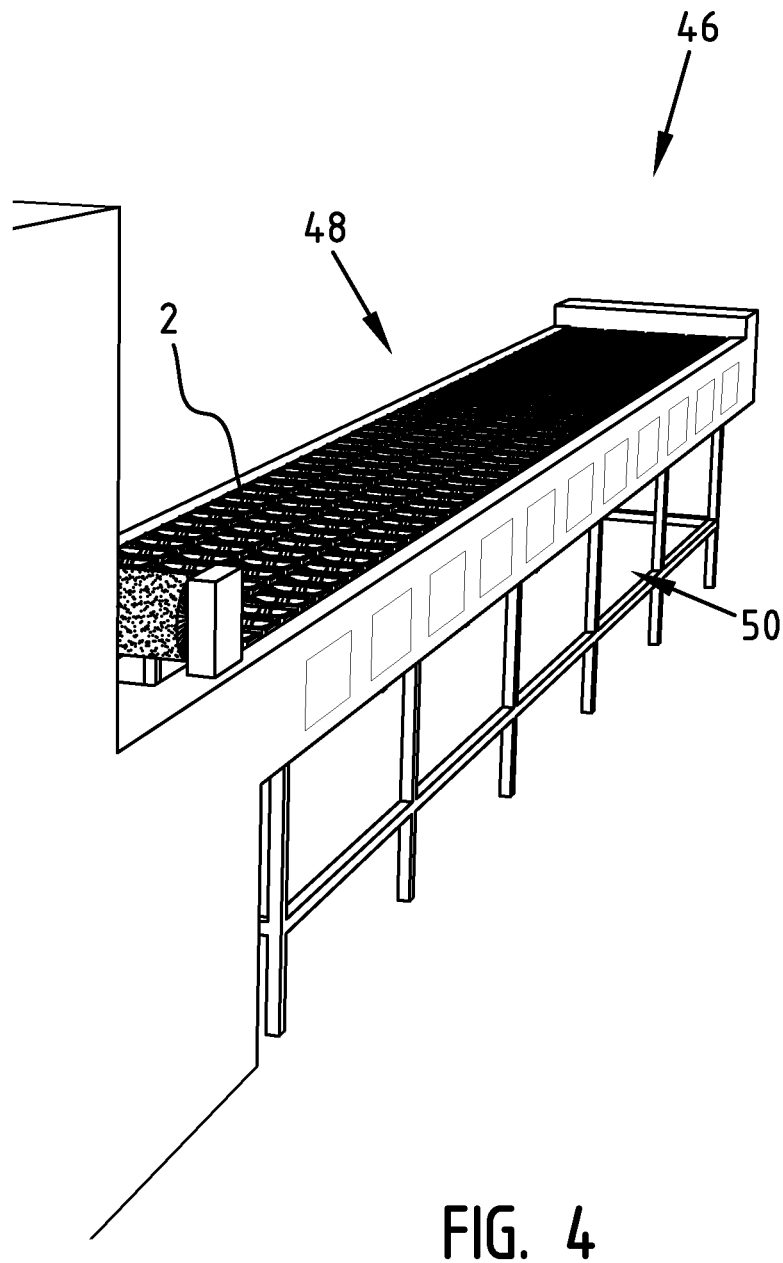
FIG. 4 shows a view of a transport device provided with a holder according to the invention.

A transport device 46 (FIG. 4) is provided with a large number of holders 2. In the shown embodiment device 36 is provided with four rows 48 of holders 2 which are movable using two or more conveyor chains (not shown). Provided on side 50 of device 46 are positions for outfeed belts onto which holders 2 can discharge the products in sorted manner. Shown holders 2 are provided with two ball joints (not shown), for instance to enable a small relative movement of arms 18, 20 for correcting misalignment of carrier surface or cup 4.

A product is laid in the carrier surface or cup 4 of holder 2. Holder 2 with product is then transported in transport device 46. At the location of the selected discharge position the tilting pin 14 of holder 2 is released, whereby holder 2 will rotate around shaft 6. The product will hereby be discharged from carrier 4 as a released product, wherein during the movement of the released product it is supported using flap 10. A measurement of for instance the weight can be performed during transport. Holder 2 is carried here over a weighing plate, wherein holder 2 is provided on the underside with three contact points. A stable, consistent measurement is obtained due to the movement of arms 18, 20 around second shaft 8.

The present invention is by no means limited to the above described preferred embodiments thereof. The rights sought are defined by the following claims, within the scope of which many modifications can be envisaged. It is thus for instance possible to omit the flap subject to, among other factors, the product to be transported in the holder according to the invention.

The invention claimed is:

1. A holder for sorting and/or transporting products, comprising:
    a product carrier movable in a transport direction for receiving and transporting the product to be transported;
    a first shaft operatively connected to the product carrier for rotating the product carrier in order to discharge the product transported with the product carrier;
    tilting means for tilting the product carrier about the first shaft at a discharge position to release the product; and
    a second shaft which is operatively connected to the product carrier and to which a flexible flap is releasably attached for discharging the released product from the product carrier in a controlled manner.

2. The holder as claimed in claim 1, further comprising an arm which is connected on one side to a mounting shaft and connected on another side to the first and/or second shaft.

3. The holder as claimed in claim 2, wherein the mounting shaft extends through or close to the centre of gravity of a holder filled with product.

4. The holder as claimed in claim 2, wherein the arm is rotatable.

5. The holder as claimed in claim 2, wherein the holder is provided with two or more arms which are rotatable independently of each other.

6. The holder as claimed in claim 5, further comprising a ball hinge provided between the arm and first and/or second shaft.

7. The holder as claimed in claim 1, wherein the product carrier is provided symmetrically such that the holder can be mounted on either side of transport means of a device for one or more holders.

8. The holder as claimed in claim 1, wherein the first shaft can be connected using a coupling piece to a transport means of a device for one or more holders.

9. The holder as claimed in claim 8, wherein the coupling piece is embodied such that a form-fitting can be realized with the transport means to which the first shaft can be connected.

10. The holder as claimed in claim 1, wherein the flexible flap comprises at least one opening.

11. The holder as claimed in claim 1, further comprising a fixation member for fixing the product carrier in axial direction of the first shaft.

12. A device for sorting and/or transporting products, wherein the device is provided with a holder as claimed in claim 1.

13. A method for sorting and/or transporting products, comprising the steps of:
    placing a product in a holder as claimed in claim 1;
    transporting the product in the holder; and
    discharging the product from the holder.

14. The method as claimed in claim 13, further comprising of weighing a holder.

* * * * *